July 9, 1929.   R. HOMAN   1,719,886
SNOWSCRAPER
Filed May 31, 1927

Inventor
Rex Homan
By Frank E. Liverance Jr.
Attorney

Patented July 9, 1929.

1,719,886

UNITED STATES PATENT OFFICE.

REX HOMAN, OF HESPERIA, MICHIGAN, ASSIGNOR TO CHARLES G. WILLETT, OF GRAND RAPIDS, MICHIGAN.

SNOWSCRAPER.

Application filed May 31, 1927. Serial No. 195,227.

This invention relates to a snow scraper adapted to be attached to a motor truck and used either alone or in conjunction with the usual road scraper attached to said truck. The scraper attachment of my invention is connected at one side of and extends outwardly from the truck frame and is capable of vertical adjustment so that lower edge of the scraper blade may be located in close contact with or slightly above the surface scraped, and is further capable of an adjustment about a vertical axis so that its angle to the direction of movement of the truck may be varied. With a scraper attachment of this invention attached to the truck and with the truck already equipped with a road scraper, snow may be scraped from the road in one travel of the truck over the road it not being necessary to turn the truck around and pass over the road twice as has heretofore been done with a truck equipped with only the road scraping attachment.

The snow scraping attachment of my invention is also particularly useful when it is used in conjunction with the well known type of V-shaped snow plow attached at the front end of the truck. Such snow plow moves the snow laterally and the scraper of my attachment following along behind moves the shoulders so-called farther outward; that is the snow which as it leaves the sides of the snow plow forms an upstanding shoulder of snow along the sides of the road is engaged and scraped farther outward.

The device of my invention is particularly adapted for application to motor trucks but the invention is in no sense limited to such single type of vehicle, it may be applied to tractors of various kinds, to tractor graders and the like and is particularly useful for high speed clearing of roads of snow. While it may be applied to a truck on which a scraping blade is mounted, it may be used independently of said blade or with the same and is in no sense limited in use to a conjunction of some other snow scraping and removing attachment to the tractor truck or other vehicle to which it is attached.

For an understanding of the invention reference may be had to the following description taken in connection with the accompanying drawing, in which, Fig. 1 is a plan view of a truck chassis showing the same having my invention applied thereto.

Like reference characters refer to like parts in the different figures of the drawing.

Figure 1:
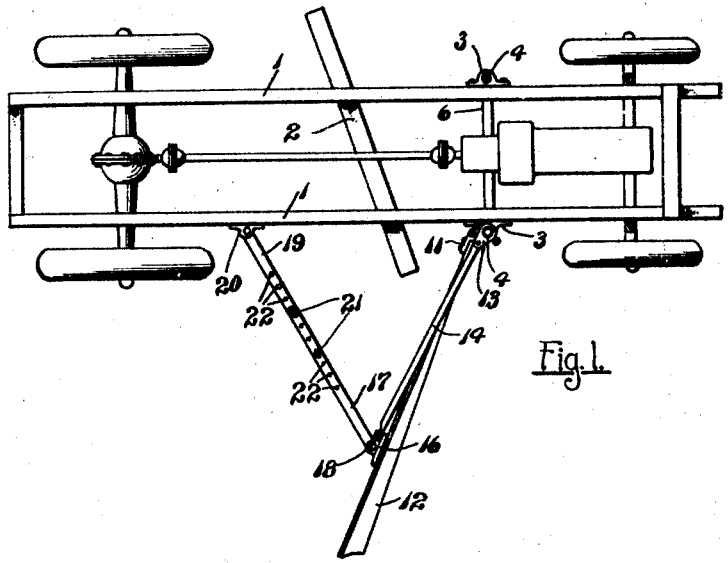
Figure 2:
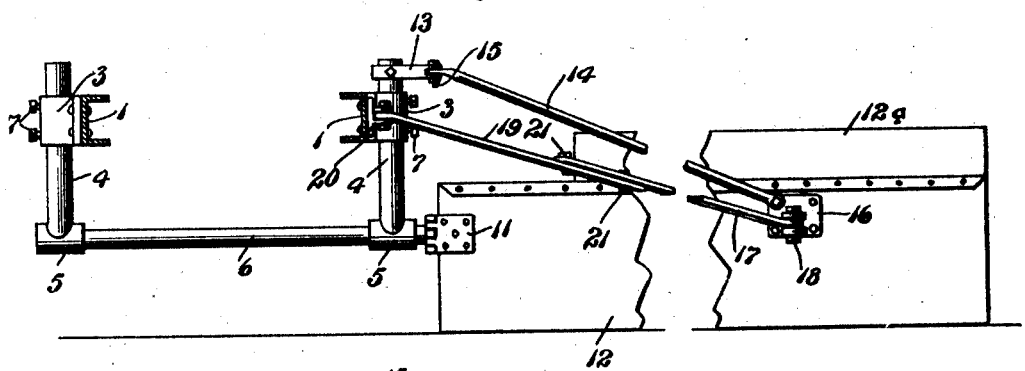
Fig. 2 is a transverse vertical section through the truck frame the snow scraping attachment on my invention appearing in the rear elevation.

The truck frame has the usual side frame members 1 parallel to each other and to the length of the truck on which a scraper 2 of the type shown in U. S. Letters Patent to Burns, No. 1,429,125 issued the 12th day of September 1922, may be mounted. A truck equipped with a scraper of this kind is capable not only of scraping a road surface but, when snow lies in the road, by adjusting the scraper to the proper height, snow may be scraped to one of side of the road when the truck passes over it in one direction and on the return scraped to the opposite side of the road as is evident.

The snow scraper attachment which I have invented is designed to be applied to the truck and used either singly or in connection with the road scraper 2 to which reference has been made. In the construction and application thereof to the truck frame two vertical sleeves 3 are permanently secured, one at the outer side of each of the frame members 1, through which vertical tubes 4 are adjustably mounted, the two sleeves 5 lying in horizontal alignment with each other, so that a horizontal tubular rod 6 may be passed therethrough and secured therein. The vertical tubes or posts 4 are held in any position to which adjusted in the sleeves 3 by means of set screws 7.

Figure 3:
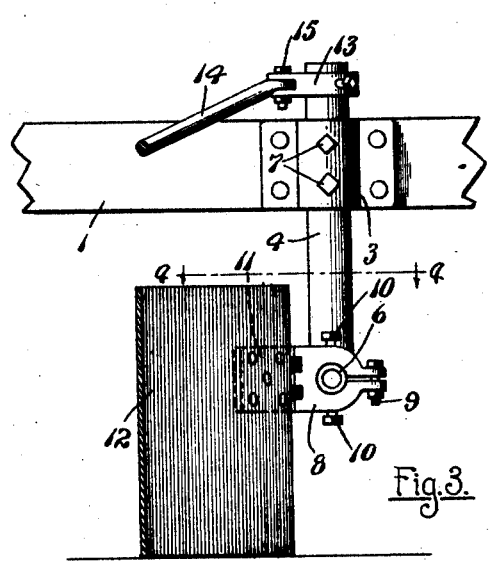
Fig. 3 is a fragmentary side elevation of the truck frame, the attachment showing in end elevation and partly in section.
Figure 4:
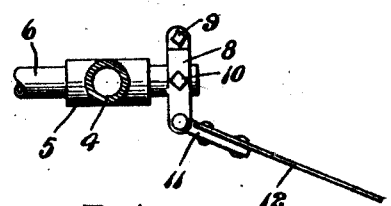
Fig. 4 is a horizontal section taken substantially on the plane of line 4—4 of Fig. 3.

At one end of the tubular rod 6 a split head 8 is located and clamped firmly thereon by means of a clamping bolt 9 and the head is further secured to the rod by set screws 10, as shown in Fig. 3. A plate 11 is hinged to the head 8 to swing about a vertical axis to which a snow scraping blade 12 of sheet metal is permanently connected by rivets or bolts. Said blade 12 extends outwardly a distance from the truck.

To the upper end of the post 4 at the side where the blade 12 is positioned a member 13 is secured by means of set screws and a rod 14 is pivotally connected at 15 at one end to said member, extending therefrom downwardly and outwardly to a bracket 16 which is riveted or otherwise secured to the blade 12. The rod 14 serves to support the outer end of the blade and keep it from dragging on the ground. There may be attached to the blade 12 at its outer portion and at its upper edge an upper extension 12ª.

The bracket 16 is provided with two spaced apart outwardly extending ears between which one end of a bar 17 is located, a pivot bolt 18 passing through the ears and the end of the bar. A second bar 19 is pivotally connected at its inner end to a bracket 20 secured to the truck frame member 1 a distance back of the sleeve 3. The two bars 17 and 19 overlap at their meeting ends and are connected together by two bolts 21 which pass downwardly through openings 22 made in the bars. It is evident that the bars 17 and 19 may be adjusted so as to bring different openings 22 therein into alignment for the passage of the bolts 21 and such adjustment changes the angle of the blade 12 to the length of the truck frame.

As thus installed the blade 12 may be adjusted so as to lie in close proximity to or slightly above the surface of the road from which the snow is to be scraped and by adjusting the two bars 17 and 19 the angle of the blade to the length of the truck may be properly adjusted. The bars 17 and 19 also serve as a brace to strengthen and reinforce the blade 12 and resist the pressure brought against the front side of the plate when it is scraping the snow. The rod 14, as previously stated, holds the blade at its outer end from dragging on the ground.

The scraping blade 2 is inclined so as to scrape the snow to one side of the road while the blade 12 scrapes it to the opposite side. The inner end of the blade 12 comes in front of one end of the road scraper 2, this insuring that no snow will be left at the middle of the road.

The construction described has proved very practical and efficient. It works best in conjunction with a truck already equipped with the usual road scraper but it is of course evident that it is useful attached to a truck or any other vehicle whether or not said truck or other vehicle is equipped with road scraper mechanism. The invention is defined in the appended claims and is to be considered comprehensive of all forms of structure coming within their scope.

I claim:

1. In combination with a truck having side frame members, of sleeves positioned vertically and attached one to each frame member, vertical posts adjustably mounted in said sleeves, a rod connecting the lower end of the post, a scraper blade pivotally connected at one end to one end of said rod, a supporting rod secured at one end to the blade and at its opposite end pivotally connected to a post adjacent the upper end thereof, and a diagonal brace disposed between the blade and chassis frame member and having pivotal connections at its ends, respectively, to said blade and chassis frame member.

2. In combination with a truck frame having spaced apart side frame members, a pair of posts vertically adjustable on said members and extending below the same, a rod disposed between and secured to the lower ends of said posts, a scraper blade pivotally connected to one end of the rod, means disposed between said blade and one of said posts for supporting the outer portion of the blade and holding it against downward movement, and bracing means located between the rear side of said blade and one of said truck frame members, substantially as described.

3. An attachment adapted for application to motor trucks, comprising a pair of spaced apart vertical posts, a rod located between and connecting the lower ends of said posts, a scraper blade pivotally connected at one end to an end of said rod for turning about a vertical axis, a supporting rod secured at one end to said blade adjacent its outer end and pivotally connected at its opposite end to the adjacent post near the upper end thereof, and a brace pivotally connected to said blade at its rear side and adapted to be extended rearwardly and inwardly for attachment to a side member of the truck frame on which the attachment is mounted.

4. In combination with a truck frame having spaced apart side frame members vertically positioned, sleeves attached one to each side frame member of the truck, vertical posts adjustably mounted through said sleeves, a rod located between and connecting the lower ends of said posts, a scraper blade pivotally connected at one end to an end of said rod to turn about a vertical axis, means disposed between one of said posts and the scraper blade for supporting the outer end thereof and permitting the blade to turn about its vertical pivotal axis, a bar pivotally connecting at one end to the rear side of the blade, a second bar pivotally connected at one end to the adjacent side frame member of the truck, said bars having overlapping ends, and means to connect the overlapping ends of the bars together, said bars being movable to different positions with respect to each other to increase or decrease their overall length.

5. In combination with a truck frame having spaced apart side frame members, a pair of posts vertically adjustable on said members, a rod disposed between and secured to said posts, a scraper blade pivotally connected to said rod, means disposed between said blade and one of said posts for supporting the outer portion of the blade, and bracing means extending between said blade and one of said truck frame members.

In testimony whereof I affix my signature.

REX HOMAN.